(12) United States Patent
Ball et al.

(10) Patent No.: US 10,392,281 B2
(45) Date of Patent: Aug. 27, 2019

(54) MEANDER SEPTIC TANK

(71) Applicant: Orenco Systems Incorporated, Sutherlin, OR (US)

(72) Inventors: Eric S. Ball, Roseburg, OR (US); Terry R. Bounds, Roseburg, OR (US)

(73) Assignee: Orenco Systems Incorporated, Sutherlin, OR (US)

(*) Notice: Subject to any disclaimer, the term of this patent is extended or adjusted under 35 U.S.C. 154(b) by 0 days.

(21) Appl. No.: 15/713,425

(22) Filed: Sep. 22, 2017

(65) Prior Publication Data

US 2019/0092664 A1    Mar. 28, 2019

(51) Int. Cl.
*C02F 3/28* (2006.01)
*E03F 11/00* (2006.01)
*B01D 21/00* (2006.01)

(52) U.S. Cl.
CPC .......... *C02F 3/284* (2013.01); *B01D 21/0033* (2013.01); *C02F 3/2866* (2013.01); *E03F 11/00* (2013.01); *C02F 2203/006* (2013.01)

(58) Field of Classification Search
CPC ............ B01D 21/0033; B01D 21/0066; B01D 21/0087; B01D 21/2405; C02F 3/284; C02F 3/2866; C02F 2203/006; E03F 11/00
USPC ............................ 210/521, 532.1, 532.2, 801
See application file for complete search history.

(56) References Cited

U.S. PATENT DOCUMENTS

| | | | | | |
|---|---|---|---|---|---|
| 1,655,639 A | * | 1/1928 | Wilson | ...................... | C02F 3/28 210/532.2 |
| 2,367,270 A | * | 1/1945 | Evans | ...................... | C02F 3/28 210/532.2 |
| 3,031,083 A | * | 4/1962 | Schreiber | ............. | B01D 21/003 210/532.2 |
| 4,363,732 A | * | 12/1982 | Crates | ................ | B01D 21/2405 210/532.2 |
| 4,957,621 A | * | 9/1990 | Rohloff | .............. | B01D 21/003 210/521 |
| 5,266,191 A | * | 11/1993 | Greene | .............. | B01D 21/0039 210/521 |

(Continued)

FOREIGN PATENT DOCUMENTS

| DE | 1137691 | * 10/1962 |
|---|---|---|
| DE | 202016008244 | * 8/2017 |

OTHER PUBLICATIONS

CEE 484 Decentralized and Onsite Wastewater Management and Reuse, Septic Tanks, Apr. 4, 2007, H. David Stenzel.

*Primary Examiner* — Christopher Upton (74) *Attorney, Agent, or Firm* — Chernoff, Vilhauer, McClung & Stenzel, LLP (57) ABSTRACT

A round meander septic tank includes an elongate baffle that divides the interior space of the tank into two semicircular chambers. Untreated wastewater is introduced to the first chamber through an inlet located near the first end of the baffle. The wastewater flows through the first chamber to a portal at the second end of the baffle and passes through the portal into the second chamber. A wastewater outlet from the tank is located in the second chamber near the first end of the baffle. Wastewater passing through the portal flows through the second chamber to the outlet and out of the tank. The baffle and the shape of the septic tank increase the distance that the wastewater must flow from the inlet to the outlet as compared to a rectangular meander tank with a single baffle.

5 Claims, 6 Drawing Sheets

(56) References Cited

U.S. PATENT DOCUMENTS

| | | | |
|---|---|---|---|
| 7,572,372 B2 * | 8/2009 | Graf | C02F 3/1242 |
| | | | 210/532.2 |
| 8,151,999 B1 * | 4/2012 | Moore, Jr. | E03F 11/00 |
| | | | 210/532.2 |
| 2009/0050583 A1 * | 2/2009 | Arnott | E03F 5/101 |
| | | | 210/801 |
| 2010/0213119 A1 * | 8/2010 | Generes | B01D 21/003 |
| | | | 210/521 |
| 2013/0213873 A1 * | 8/2013 | Stemmer | B01D 21/0033 |
| | | | 210/252 |

* cited by examiner

MEANDER SEPTIC TANK

FIELD OF INVENTION

This invention relates to septic tanks

BACKGROUND OF INVENTION

A typical domestic septic tank is a watertight container that receives wastewater from toilets, sinks, and household appliances, provides a primary level of treatment of the wastewater, and then releases the primary treated wastewater to a drainfield or further treatment equipment. A simple septic tank may have rectangular or cylindrical shape. The wastewater is received from the source through an inlet and travels the length of the tank to an outlet. While in the tank the wastewater separates into three layers. As the wastewater flows through the tank from the inlet to the outlet, solids tend to fall to the bottom of the tank and form a sludge layer. Grease, light floating particles, and gas-buoyed sludge rise toward the surface of the wastewater to form a scum layer. A middle layer between the sludge and the scum is referred to as the clear layer. Sometimes upper and lower baffles are arranged perpendicular to the flow to create chambers that retain the sludge and scum. At the downstream end of the tank, primary treated wastewater from the clear layer is discharged from the outlet while the sludge and scum are retained in the tank and are periodically pumped out.

The flow of wastewater is often delivered to the tank in surges. In the tank the flow of wastewater slows down, allowing the solids to drop out and the scum layer to form. Generally, the longer the wastewater resides in the tank, the more solids and scum migrate out of the clear layer. While a large tank increases the residual time, large tanks are more expensive to construct, transport, and install. Maximizing the distance that wastewater travels between the inlet and the outlet also encourages the separation of wastewater into the three layers.

A meander tank is one way to increase the length of flow of wastewater from the inlet 18 to the outlet while not increasing the size of the tank. A meander tank uses one or more baffles generally parallel to the flow to create zones or chambers and increase length of flow between inlet and outlet. Two examples of rectangular meander tanks are disclosed in CEE 484 Decentralized and Onsite Wastewater Management and Reuse, Septic Tanks, Apr. 4, 2007, H. David Stenzel. One such meander tank uses a baffle parallel to the walls of the tank to create two longitudinal chambers causing the wastewater to flow substantially twice the length of the tank from the inlet to outlet. Another meander tank uses two baffles to create three chambers requiring the wastewater to travel approximately three times the length of the tank to reach the outlet.

A disadvantage of the rectangular meander tanks shown in CEE 484 is that the corners create dead spaces where there is little flow and thus portions of the tank do not contribute to length of flow of wastewater as it moves through the tank. Put another way, the full volume of the tank could be used to contribute to the length of flow if there were no dead spaces.

BRIEF SUMMARY OF THE EXEMPLARY EMBODIMENT OF THE INVENTION

A substantially round septic tank includes a baffle within the interior space of the tank. The baffle extends across the tank creating first and second chambers. A wastewater inlet near the first end of the baffle delivers wastewater into the first chamber. A portal near the second end of the baffle permits wastewater to flow from the first chamber into the second chamber. A wastewater outlet is located in the second chamber.

DETAILED DESCRIPTION OF THE EXEMPLARY EMBODIMENT

Figure 1:
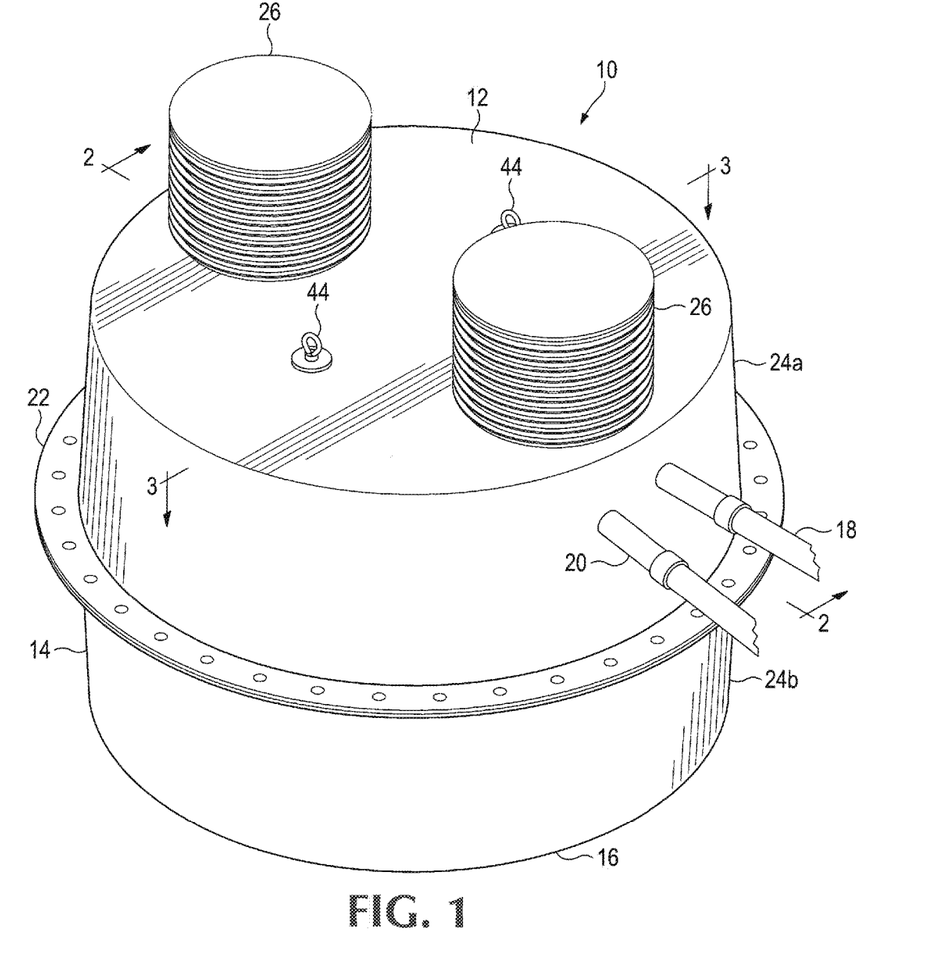
FIG. 1 is an isometric view of the exemplary embodiment of the round meander tank.
Figure 4:
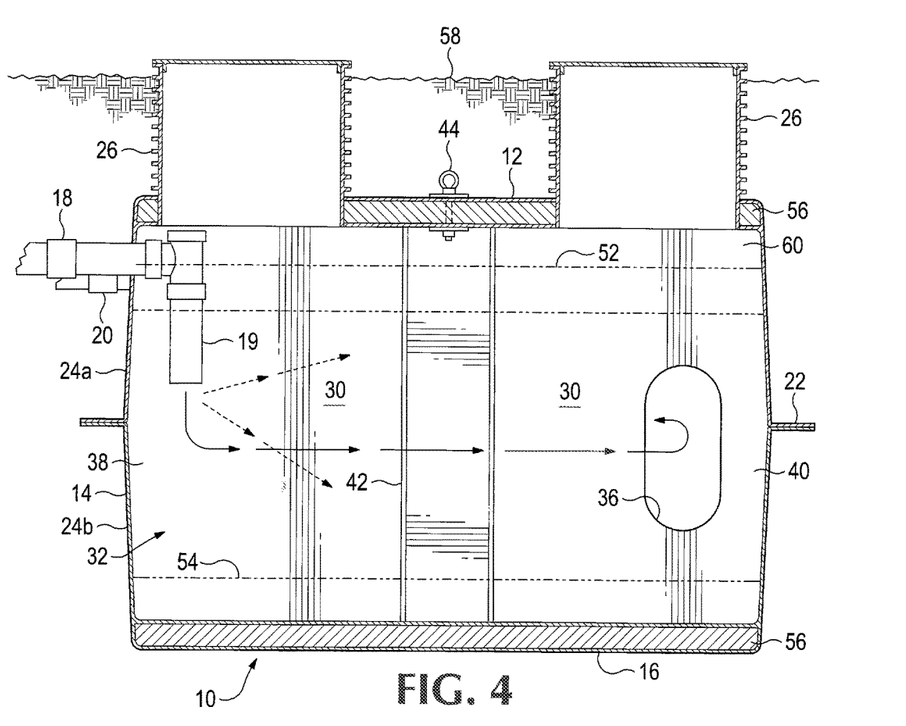
FIG. 4 is a sectional view of the tank of FIG. 3 along line 4-4.

Referring to FIGS. 1 and 4, a round septic tank 10 includes a substantially circular top 12, a substantially vertical wall 14, and a substantially circular floor 16, creating an enclosure having the general shape of an upright circular cylinder with a flat top and bottom and a diameter. The tank 10 includes a wastewater inlet 18, a wastewater outlet 20 and a circumferential flange 22 extending outwardly from said wall 14. The exemplary embodiment is constructed of thermoset plastic as a top half 24a and a bottom half 24b. The halves nest for easy transport. Each half includes a portion of the flange 22. When the halves 24a, 24b are joined together at the flanges, the resulting wall 14 is substantially, but not precisely vertical. The flange 22 is not merely a convenient way to assemble the tank 10 from two halves, but also increases the rigidity of the wall 14 and serves as an anti-buoyancy feature, preventing the tank, which in use contains air 60, from rising out of the earth in which it is typically buried. Backfilled soil pressing down on the flange 22 discourages the tank 10 from rising. The depth at which the tank 10 should be buried depends in part upon the cohesiveness of the soil. Less cohesive soil may require that the tank 10 be buried deeper. A pair of risers 26 are located on top of the tank 10. The risers 26 provide access to the interior of the tank 10 for maintenance of the components and for pumping out the accumulated scum 52 and sludge 54. The risers 26 are not part of the invention and are not shown in some of the Figures.

Referring to FIGS. 2 through 6, an elongate, substantially straight baffle 30 divides the tank into a first chamber 32 and a second chamber 34. Although the exemplary embodiment employs a straight baffle 30 which substantially bisects the tank 10 into equal first and second chambers 32, 34, the benefits of this invention may be obtained with other-than-straight baffles and unequal chambers. In the exemplary embodiment, the length of the baffle 30 approximates the diameter of the tank 10. The baffle has a first end near the inlet 18, a second end near the portal 36, and a midsection therebetween. Except for the portal 36 described below, the baffle 30 extends from the floor 16 of the tank to the top 12 preventing movement of wastewater between the first chamber 32 and said second chamber 34 except through the portal 36. A wastewater inlet 18 is located near the first end 38 of the baffle 30 and discharges wastewater into the first chamber 32. A narrow substantially vertical portal 36 is located in the second end 40 of the baffle 30 near to the wall 14 of the tank. As may be seen in FIGS. 2, 4 & 6, the portal 36 does not extend to the top 12 of the tank 10 and the bottom of the portal 36 does not extend to the floor 16. The portal 36 is separated from the wall 14 by a narrow portion of the baffle 30. In the exemplary embodiment, the inlet 18 is located in the wall 14 of the first chamber 32, near the first end 38 of the baffle 30, and the outlet 20 is located in the wall 14 of the second chamber 34 near the first end 38 of the baffle 30.

A vertical support member 42 extends between the floor 16 and the top 12 of the tank 10, substantially at the center of the baffle 30, which in this embodiment also passes through the center of the tank. In the exemplary embodiment, the support member 42 is integral with the baffle 30 and extends slightly outwardly from both sides of said baffle. The baffle 30 with integral support member 42 fits snugly in the tank and is held in place with structural adhesive. When the top half 24a and bottom half 24b of the tank are joined together by the flange 22, the baffle 30 is securely seated in the tank 10. When the tank 10 is installed in the ground, the baffle 30 and support member 42 help support the top 12, which typically has an overburden of soil 58. Thus, the weight of the soil 58 on the top 12 is transmitted to the floor 16 of the tank 10 which is supported by underlying earth.

Figure 3:
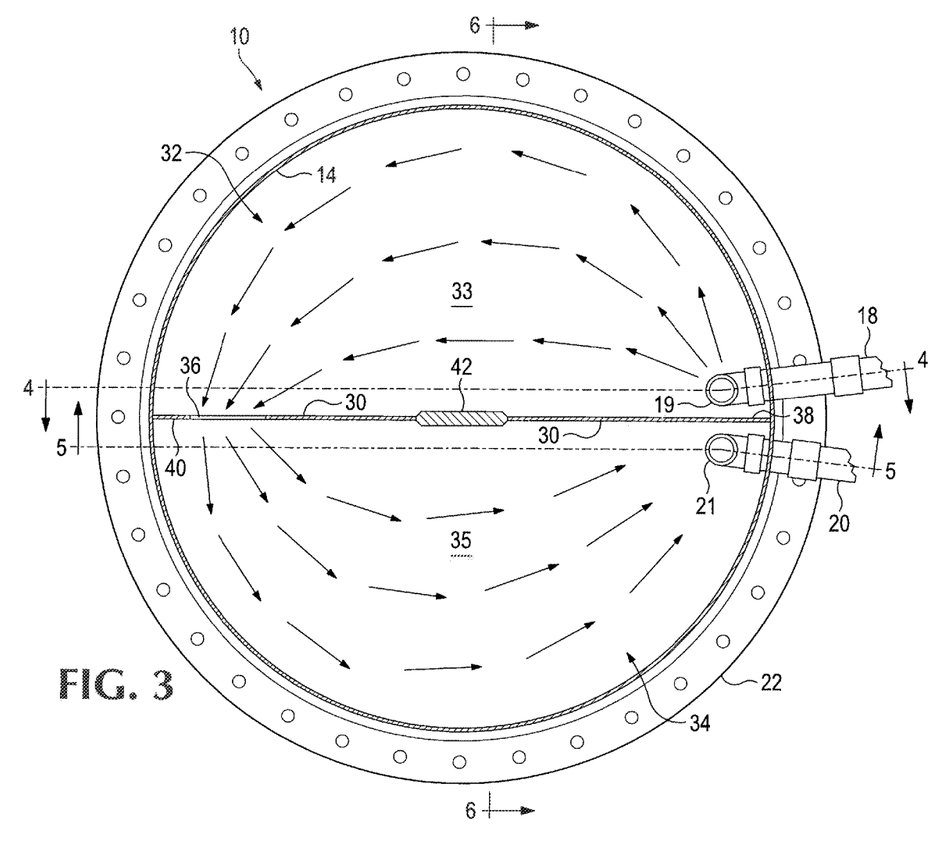
FIG. 3 is a sectional plan view of the tank of FIG. 1 with the top of the tank removed.
Figure 5:
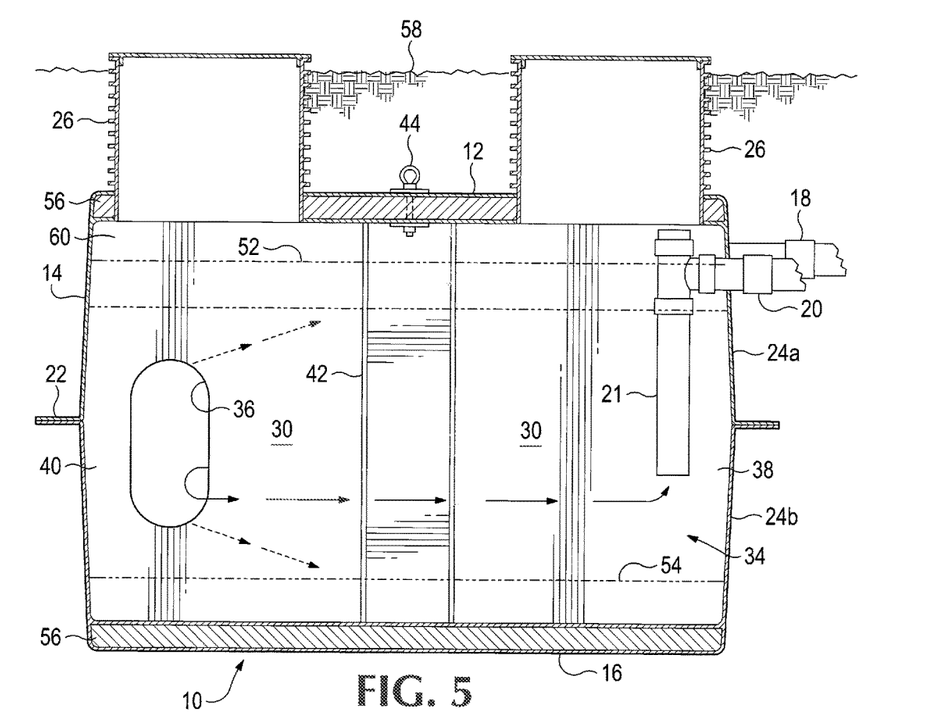
FIG. 5 is a sectional view of the tank of FIG. 3 along line 5-5.
Figure 6:
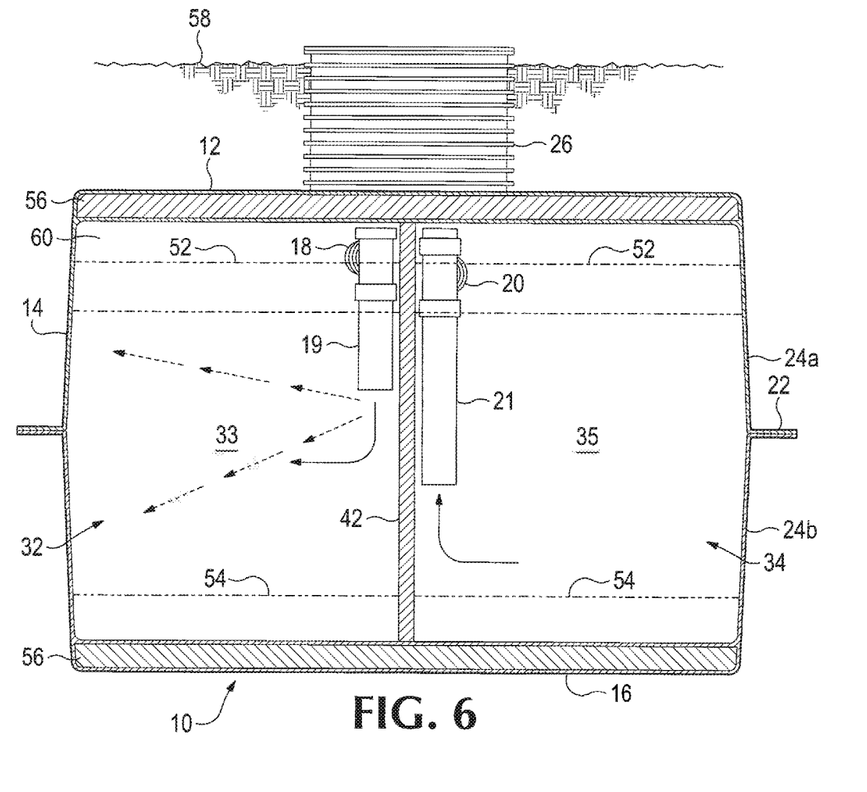
FIG. 6 is a sectional view of the tank of FIG. 3 along line 6-6.

Referring to FIGS. 1, 3 and 5, a pair of eyebolts 44 are attached to the top 12 of the tank 10. The eyebolts extend through the top and are fastened to the top by a washer and nut or other suitable means. When moving the top 12 or the assembled tank 10, straps, chains, wire, or the like can be attached to the eyebolts 44 and lifting equipment such as a truck mounted boom or crane can be used to lift or lower the tank onto a truck or into a prepared hole in the earth.

Figure 2:
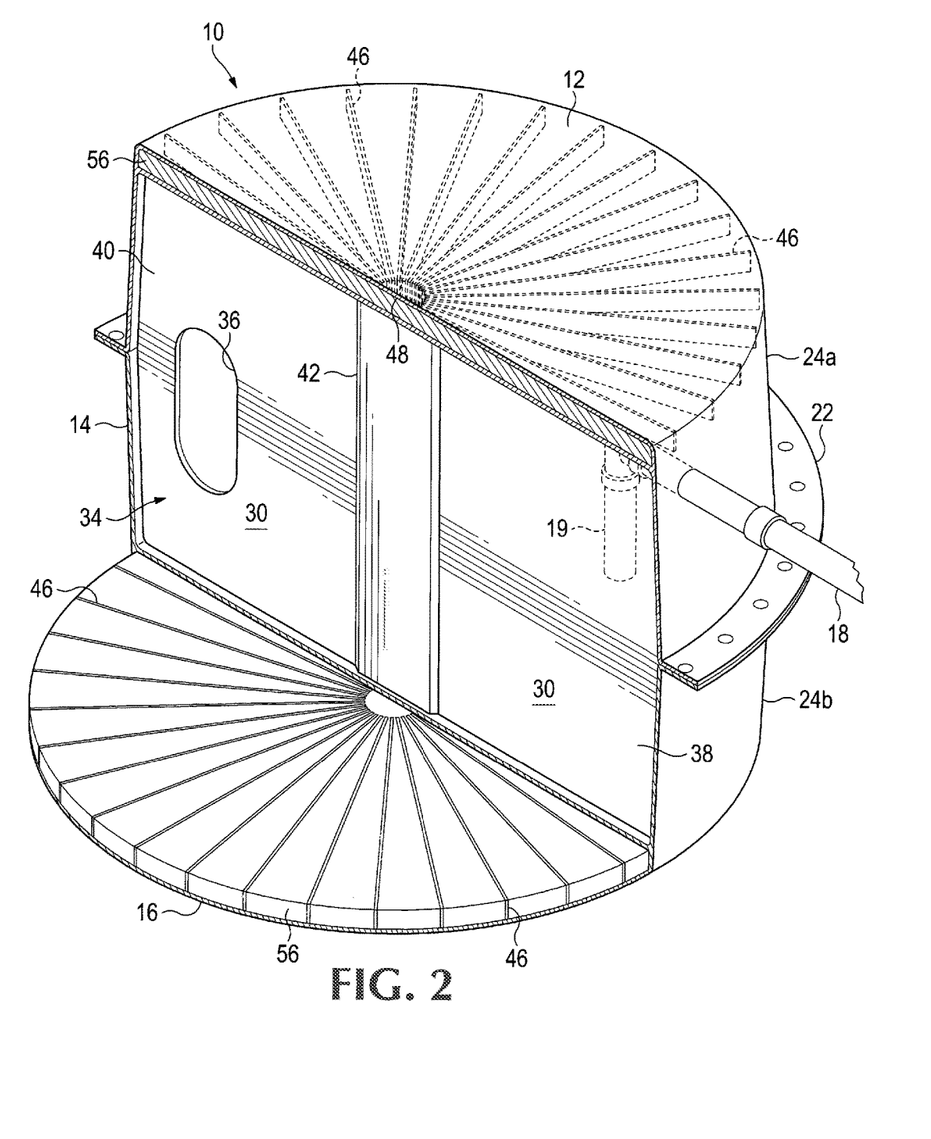
FIG. 2 is a sectional view of the tank of FIG. 1 along the lines 2-2.
Figure 7:
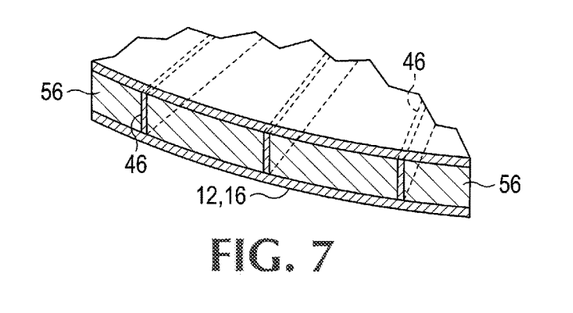
FIG. 7 is a partial sectional view of the top of the tank of FIG. 1.

The top 12 of the tank is supported by the wall 14, the baffle 30, and the support member 42. In addition to such support, the top 12 has strength and rigidity due to its construction. First, the top 12 is a vacuum-infused sandwich construction including a layer of insulation, such as a foam core 56, encased in plastic. Insulation can be important in cooler or temperate climes because the bacteria that breakdown biomaterial in the wastewater function better in temperatures above 40° F. As can be seen in FIGS. 2, 4, and 7, the top 12 includes a plurality of elongate stiffening ribs 46 between the upper and lower plates of the top 12. These stiffening ribs 46 extend inwardly from the circumference of the top 12 to converge at the center 48 of the top 12 directly over the support member 42. The combination of the wall 14, baffle 30, plastic encased foam core 56, support member 42 and converging ribs 46 provide the top 12 with sufficient strength to support further wastewater processing equipment on the top 12 or an overburden of backfilled soil 58. The floor 16 has a similar construction, a plastic encased foam core 56 with stiffening ribs 46 converging at the center of the floor. A portion of the downward forces on the top 12 is transmitted from the center 48 of the top 12 to the center of the floor 16 where the plastic encased stiffening ribs 46 and foam core 56 spread the weight throughout the floor. The exemplary tank 10 includes a pair of risers 26 extending upwardly from the top 12 of the tank 10. These risers 26 are usually set to grade to enable the interior of the tank to be accessed for repair or periodic pumping of the sludge and scum.

As best shown in FIG. 5, the outlet 20 exits the tank wall 14 at a level slightly lower than where the inlet 18 enters the tank 10. Both inlet 18 and outlet 20 include tee connections 19 and 21 with the lower portion of the tees 19, 21 extending down into the wastewater in the tank and the upper end of the tees extending upwardly into the air 60 above the scum layer 52.

In operation, wastewater from the inlet 18 is introduced into the first chamber 32 of the tank 10 through the bottom of the inlet tee 19. Because the mouth of the inlet tee 19 is near to the wall 14 and also near to the first end 38 of baffle 30, the wastewater is directed away from the first end 38 of the baffle 30 as shown by the flow arrows in FIG. 3. The incoming wastewater spreads out into the first chamber 32 and flows through the belly 33 of the first chamber 32 in the general direction of the portal 36. Because of the placement of the inlet near the wall 14 and near the first end 38 of baffle 30 some of the wastewater from the inlet 18 is directed to flow along the wall 14 of the first chamber toward the portal 36. The first chamber 32 is substantially semi-circular, wider in the middle section between the inlet 18 and the portal 36 where the wall 14 is most distant from the baffle 30. In effect the wide portion of the first chamber 32 forms a belly 33 in the flow of the wastewater from inlet 18 to portal 36 where the flow slows down, encouraging the solids to drop down and the scum to rise toward the top 12. FIG. 4 shows the rising and settling vectors as the flow of wastewater enters the belly 33 of the first chamber 32 of tank 10. As can be seen by the flow arrows in FIG. 3, the shape of the tank also increases the effective length of the flow thereby enabling more sludge to settle and more scum to float along the flow path. While the most direct and shortest route from the inlet 18 to portal 36 is along the diametrical baffle 30, much of the wastewater actually flows out and around through the fullness of the belly 33 which substantially lengthens the path of flow. Additionally, the support member 42 has beveled edges to deflect flow inwardly toward the belly 33. Due to the principles of fluid dynamics, the flow is slowed down by friction next to the wall 14 and next to the baffle 30, with the centroid of flow located in the belly 33, closer to the wall 14 than the baffle 30. When the wastewater reaches the second end 40 of the baffle 30 it is drawn into the portal 36. After passing through the portal 36, the wastewater spreads out into the belly 35 of the second chamber 34, continuing to drop solids and float scum as shown in FIG. 5, further increasing the clarity of the clear layer. As described with respect to the first chamber 32, some wastewater in the second chamber takes the long route along the wall 14 to the outlet 20. As mentioned above, placing the outlet 20 near the first end 38 of the baffle 30 maximizes the length of flow.

The shortest path from the inlet 18 to the outlet 20 is along the baffle 30 to the portal 36 and back along the baffle to the outlet. This distance is similar to the distance of flow in a single baffle rectangular tank shown in CEE 484. However, as shown by the flow arrows in FIG. 3, in the present invention most of the wastewater takes a longer path through the belly 33 and 35. Circumferential flow along the wall 14 from inlet 18 to outlet 20 would approach 3.1416×the diameter of the tank. Of course most of the wastewater does not flow along the baffle 30 or along the wall 14, so the average flow is somewhere between twice the diameter and 3.1416×the diameter.

A beneficial aspect of the exemplary tank 10 is that the wall 14 curves outwardly away from the baffle 30 near the inlet 18 and does not provide corners where dead zones having very little flow can develop. The curved wall 14 acts to direct wastewater into the flow. More specifically, the location of the inlet 18 near the first end 38 of the baffle 30 and also near the wall tends to flush wastewater out into the belly 33 of the first chamber 32. Although the flow slows down in the belly 33, there are no corners to create dead zones and the wastewater keeps moving toward the portal 36. As is apparent from the drawings, a volumetric cross-section of the belly 33 is larger than a volumetric cross-section of the first chamber 32 near the portal 36.

As shown in FIG. 5, the mouth of the outlet tee 21 reaches down into the clear layer. Wastewater from the clear layer flows up the outlet tee 21 and exits the tank 10 through the outlet 20. Although the exemplary embodiment of the septic tank 10 shown and described herein is of the gravity-discharge type, tanks utilizing discharge mechanisms other than a gravity outlet tee 21, including those where the wastewater is discharged out of the clear layer of the septic tank via a pump, are within the scope of this invention.

Although the exemplary embodiment of the septic tank 10 described herein is round, other shapes may provide similar benefits by employing similar principals. As an example only, septic tanks shaped as oval, ellipse or racetracks wherein the inlet 18 is located near a narrow end of the tank and the flow of the wastewater toward a portal at the other end of the tank must pass through a volumetrically larger region are within the scope of this invention. Like a round tank 10, such tanks provide a larger belly or midsection where the flow slows down, encouraging material to migrate out of the clear area, and also afford a flow path, longer than a cross-tank baffle, between the inlet 18 and a portal 36. As mentioned above, tank shapes having rounded corners discourage the formation of "dead zones" where there is relatively little flow. A curving wall near the inlet would discourage dead zones even if the midsection has straight walls.

Although the exemplary tank 10 employs a single straight baffle 30 creating two equal chambers 32, 34, similar results may be obtained by alternate placement of a straight baffle, or by use of a curved baffle, or by use of multiple baffles, all of which could create even longer flow paths. For example, a single straight baffle 30, shorter than the diameter of the tank could be used to create a small chamber and a large chamber, rather than two substantially equal chambers.

In this application "near" or "near to" means "close" but not necessarily directly "next to." "Near" or "near to" includes "next to" but is not restricted to next to. The drawings should be considered when giving meaning to the phrase "near" or "near to."

In this application the term "round" refers to the outline of the septic tank 10 as viewed from above. For example a tank in the form of a circular upright cylinder has a round outline as seen from above.

The term "plastic" as used herein includes thermoplastics and thermoset plastic such as fiberglass reinforced plastic.

While the foregoing is directed toward an exemplary embodiment of the present invention, other and further embodiments of the invention may be devised without departing from the scope thereof which is defined by the claims.

We claim:

1. A septic tank for treatment of wastewater comprising:
    a. a substantially cylindrical enclosure including a curved wall defining an interior space;
    b. a single baffle in said space, said baffle substantially dividing said space into first and second elongate chambers, each of said first and second chambers including a first end and a second end substantially defined by said baffle and said wall, said baffle further including a portal near said second end of said first chamber to permit wastewater to pass between said first chamber and said second chamber;
    c. a wastewater inlet to said tank located near said first end of said first chamber;
    d. a wastewater outlet from said tank in said second chamber;
    e. wherein said enclosure has a substantially circular floor.

2. A septic tank for treatment of wastewater comprising:
    a. a substantially cylindrical enclosure including a curved wall defining an interior space;
    b. a single baffle in said space, said baffle substantially dividing said space into first and second elongate chambers, each of said first and second chambers including a first end and a second end substantially defined by said baffle and said wall, said baffle further including a portal near said second end of said first chamber to permit wastewater to pass between said first chamber and said second chamber;
    c. a wastewater inlet to said tank located near said first end of said first chamber;
    d. a wastewater outlet from said tank in said second chamber;
    e. wherein each of said first and second chambers has a wide belly between said respective first and second ends; and
    f. wherein said first and second ends of said first and second chambers are relatively narrow with respect to said bellies of said respective chambers.

3. A septic tank for treatment of wastewater comprising an elongate first chamber having a first end and a second end, said first chamber having a baffle extending between said first and second ends of said first chamber and a curved wall curving outwardly away from said baffle at said first end of said chamber and inwardly toward said baffle at said second end of said first chamber defining a first belly between said first and second ends of said first chamber, said first chamber further including a wastewater inlet near said first end of said first chamber, said first end of said first chamber and said inlet arranged to direct a flow of said wastewater through said first belly toward said second end of said first chamber, wherein said first chamber is substantially free from obstruction to said flow of wastewater through said first chamber, said septic tank further including a second elongate chamber located on the opposite side of said baffle, said second chamber also including first and second ends corresponding to said first and second ends of said first chamber and a second curved wall extending outwardly from said baffle at said first end of said second chamber and inwardly toward said baffle at said second end of said second chamber, said baffle including a portal near said second ends of said first and second chambers to permit said flow of wastewater between said first and second chambers, said second curved wall defining a second belly corresponding to said first belly, wherein said second chamber is substantially free of obstruction to flow of wastewater through said second chamber.

4. The septic tank of claim 3 wherein said inlet and said first end of said first chamber are arranged to direct some of said wastewater along said wall toward said second end of said first chamber.

5. The septic tank of claim 3 wherein said portal is arranged to direct wastewater through said second belly.

* * * * *